Figure 1:
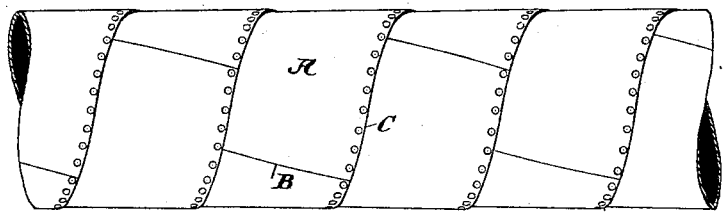

(No Model.)

J. B. ROOT, Dec'd.
H. M. Root & W. S. Church, Administrators.
SHEET METAL PIPE.

No. 379,663. Patented Mar. 20, 1888.

WITNESSES:
Frank E. Hartley
Robt F. Gaylord

INVENTOR
John B. Root
BY
Duncan, Curtis & Page
ATTORNEYS.

UNITED STATES PATENT OFFICE.

JOHN B. ROOT, OF PORT CHESTER, NEW YORK; HANNAH M. ROOT AND WILLIAM S. CHURCH ADMINISTRATORS OF SAID JOHN B. ROOT, DECEASED.

SHEET-METAL PIPE.

SPECIFICATION forming part of Letters Patent No. 379,663, dated March 20, 1888.

Application filed June 10, 1886. Serial No. 204,822. (No model.)

*To all whom it may concern:*

Be it known that I, JOHN B. ROOT, of Port Chester, in the county of Westchester and State of New York, have invented certain new and useful Improvements in Metal Pipes; and the following is a full, clear, and exact description thereof, reference being had to the accompanying drawings.

The invention relates to spirally-formed pipes or tubing, made by winding a sheet-metal blank into spiral form, with its opposite edges overlapped, and riveting such edges together. The sheet metal from which such pipe is made is usually limited in size to plates or strips of a length rarely exceeding fourteen feet, and this is because of the difficulties in manufacturing such metal in greater sizes, as also because of the inconveniences of handling, commercially, greater sizes. In manufacturing spirally-formed pipe, therefore, it has been found necessary to unite the short plates or strips cut from such commercial iron end to end, so as to form a continuous blank adapted to the requirements of making such pipe in any desired lengths, and in making such continuous blank it has been usual to overlap the short pieces that constitute it and rivet them together; but in so doing the blank thus formed is doubled in thickness where such joints occur, and such extra thickness, together with the projecting rivet-heads and shanks, interferes with the regular spiral laying of the blank, causes the winding and riveting machinery to act irregularly, and produces an opening of more or less size, through which leaks take place, and this is most particularly so where the spiral seam is formed by riveting. Furthermore, if a section of finished pipe is severed through such a lateral seam of the blank, the irregularity formed by such lateral seam becomes an obstacle in properly connecting the section of pipe to its adjoining section when finally laid, and may require the cutting off from such a section of all that part of its end having such lateral seam, thus causing an undesirable waste of material.

It is the object of the present invention to obviate these objections produced by thus riveting together the short pieces that compose the continuous blanks used for making spirally-formed pipe; and the invention consists in a pipe formed from a blank wound spirally, with its opposite edges overlapping and riveted together, said blank being composed of short strips or plates of the width of the blank, which strips are welded together end to end, so that the whole blank is of a substantially uniform thickness throughout.

Figure 2:
Figure 3:
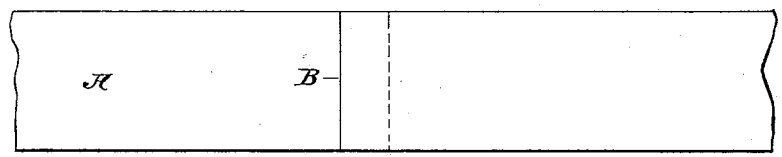
Figure 4:
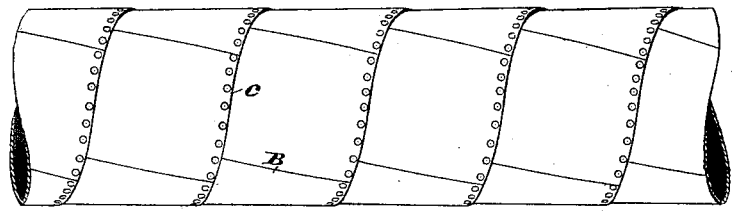

In the drawings accompanying this description, Figure 1 is a perspective view of a section of pipe made according to the invention. Fig. 2 is a plan view of a portion of the blank composing the same. Fig. 3 is a lengthwise section of the same, and Fig. 4 is a view of a section of pipe made from shorter plates than those shown in Fig. 1.

In manufacturing this pipe strips A, of the width of the blank needed, are cut from the common marketable sheet-metal iron, and these strips are welded together at their ends by a lap-weld or other joint, B, so made as to leave the blank of a uniform thickness throughout. The continuous blank thus produced is then run through a suitable pipe-forming machine and shaped into a spiral form, its opposite edges being riveted together along a continuous spiral seam, C, as seen in Figs. 1 and 4.

It will be noticed that when the blank is wound into shape the welded seams or joints B lie in a spiral direction around the pipe, but that they run at right angles to the seam C and are interrupted or broken by such seam, so that the pipe produced is partly welded and partly riveted, the two methods of fastening the plates to one another being each used where best adapted to serve their end. Pipe made in this way is without undesirable irregularity in form, it has tight and strong joints throughout, it can be divided into sections of any length without regard to where the lateral seams may occur and without waste of material, and the method of combined welding and riveting is economical in that it permits the practical use of short plates.

A machine for welding together the strips composing the blank for making such pipe is shown and described in my application for a patent filed June 27, 1886, numbered 170,020, and now pending.

What is claimed as new is—

5. A sheet-metal pipe consisting of plates riveted together along a continuous spiral lap-joint and lap-welded together along short or interrupted spiral seams, which are of substantially the thickness of the body of the plates and extend at right angles to the continuous spiral riveted lap-joint, as set forth.

JOHN B. ROOT.

Witnesses:
ROBT. F. GAYLORD,
ROBERT P. HARLOW.